Dec. 28, 1965 R. S. WEBB 3,226,599
HIGH FREQUENCY GAS RECTIFIER CIRCUIT
Filed July 5, 1960
2 Sheets-Sheet 1

INVENTOR.
ROBERT S. WEBB.
BY
M. K. Murphy
ATTORNEY

INVENTOR.
ROBERT S. WEBB
BY
ATTORNEY 3,226,599

HIGH FREQUENCY GAS RECTIFIER CIRCUIT

Robert S. Webb, Bloomfield Hills, Mich., assignor to Elox Corporation of Michigan, Troy, Mich., a corporation of Michigan Filed July 5, 1960, Ser. No. 40,863
2 Claims. (Cl. 315—181)

This invention relates to improvements in the art of electrical-discharge-machining, sometimes referred to as "spark-machining," or as EDM.

It relates particularly to the utilization of gas rectifiers in an EDM circuit. All manufacturers' ratings on gas rectifiers and their limitations of use indicate that they cannot be effectively applied in high frequency circuitry. By "high frequency," I mean any range of frequency where rectifiers of the general characteristics and power handling capabilities of a gas rectifier are required above 10 kc. Manufacturers' ratings generally indicate that for any of several reasons, gas rectifiers cannot be used in such circuitry. It is further known that the use of gas tubes in general is confined to low frequency operation. In fact, several EDM circuits have employed either thyratrons or ignitrons for controlling the cutting power. An inherent limitation of all such gas devices is the extremely long deionization time required for control, thereby suggesting low frequency, high power operation.

The general principles of gas rectifiers have been well known for many years. It is well known, for example, that the ionization or deionization time of a gas rectifier is extremely slow, in that most power rectifiers require approximately 100 microseconds for ionization or approximately 1000 microseconds for deionization. As a control device, this type of response would be totally unacceptable in circuitry requiring frequencies above 1000 cycles per second. It is further known that the cathode of such a rectifier is constructed of a suitable emissive material and is heated to produce relatively high densities of electrons by thermionic emission. It is further known that the anode of such rectifiers is composed of graphite or tungsten or other stable high temperature conductive material. The long ionization and deionization time of such a rectifier is an extreme problem where any fidelity is required. Furthermore, its non-linear characteristics seriously distort most types of high frequency intelligence. EDM, however, is extremely non-critical in respect to linearity or careful control of current or voltage amplitudes when compared to such things as a radio or television transmitting circuit. The only requirement of EDM is that pulses be controlled as to repetition rate and have a distinct unilateral pulse characteristic having clear periods of time of conduction followed by a distinct off-time for deionization or transfer of the electric discharge. I find that gas rectifiers when used in circuits like those herein described, are very satisfactory devices for producing such pulse characteristics for the many reasons that will be brought out in the following discussion.

Furthermore, I find that as a rectifier element below two magacycles in operating frequency, these devices produce rectified power entirely suitable for EDM operations. I find, furthermore, that the reverse recovery characteristics of gas rectifiers are superior to any other high current, medium voltage rectifiers. It is well known, for example, that selenium rectifiers have inherently large capacity and slow reverse voltage recovery characteristics. The more recently developed silicon rectifiers have much faster recovery characteristics and less inherent capacity and are usable for high frequency rectification. As frequency increases, all rectifiers conduct more reverse current because of internal inherent capacity. This is true even of vacuum rectifiers which are a more obvious choice for high frequency work. Furthermore, rectifiers that depend upon molecular conduction have additional limitations of extremely long transit or recovery time to properly deionize positive ion carriers. This is true of either gas rectifiers or solid state rectifiers, such as selenium, germanium, or silicon cells. Solid state rectifiers suffer the additional limitation that all such positive ions in the boundary layers must be neutralized before reverse conduction ceases. In today's advanced technology, the principles of solid state rectification are generally known. In regard to gas rectifiers, it is further known that anode secondary emission tends to produce a negatively charged layer during the conduction cycle in extremely close dimensional proximity to the anode, but of an extremely long molecular spacing. It is further believed that electron conduction occurs through the plasma by electrons moving at relatively high velocities across a chain of positive ions or electron carriers, referred to in solid state physics as "holes."

It is further believed that upon application of a reverse voltage, breakdown of a gaseous rectifier occurs by "glow" discharge from the cold graphite anode as it becomes negatively charged according to the characteristics of a Townsend discharge. The reverse voltage rating of such a rectifier is determined from the gas type and gas pressure as well as the physical dimensions of the device itself, and the reverse voltage limit is determined by field strengths insufficient to cause Townsend discharge from the anode. At frequencies above 10 megacycles, the extremely close spacing of the virtual cathode produced by the plasma results in an extremely high reverse capacity effect as the anode becomes negatively charged, thus causing high reverse current leakage during the first fraction of a microsecond. Such reverse leakage even of a fraction of a microsecond is unacceptable in high fidelity circuitry, particularly since it tends to produce oscillation in other elements of the high fidelity circuitry, thereby resulting in a distorted wave form. In EDM, none of these objections is at all important since the frequency of operation generally falls between 10 kc. and 1 megacycle in which the effect of these minute reverse transients is negligible upon the overall EDM results. Furthermore, the characteristics of an EDM working gap appear that for this portion of a microsecond, the gap is extremely immobile and does not cause reverse firing. Oscillations or non-linearity are unimportant in EDM performance so long as some amount of conduction exists for the predetermined time and a definite period of non-conduction exists. Gas rectifiers are extremely well suited for this mid-frequency high current form of operation, actually outside of the normal ratings of such devices.

The other two considerations for use of gas rectifiers in EDM circuitry supply unexpected advantageous results. The second consideration for use of gas rectifiers in EDM circuitry is that the nature of ionic conduction in the gas rectifier as well as in the arc exhibit negative resistance characteristics. The normal pickup voltage for a gas rectifier is approximately 13 volts. During heavy conduction, this falls to about 7 volts and during extremely heavy conduction falls even lower in voltage rather than increasing in voltage as other rectifiers do. In a solid state rectifier, for example, as high current, short duration pulses of conduction occur, the resistance of such a device actually increases with an increase in current. In other words, in a gas rectifier, an increase in current causes an even more drastic reduction in apparent resistance and the resulting voltage of the gas rectifier is less under high current than under low current. In a solid state rectifier, the apparent resistance of the device actually increases with higher currents and the voltage drop increases by an amount actually in excess of the relative increase in current exhibiting positive resistance characteristics. This consideration becomes extremely important during the high current conduction characteristics of an EDM arc, particularly when extremely high current, short duration pulses are used. This positive resistance characteristic of a solid state rectifier requires choice of a unit much larger than required for the average or D.C. conduction characteristics of the EDM gap because of the positive resistance characteristic of such rectifiers. Gas rectifiers, on the other hand, decrease in voltage and corresponding power requirement with an increase in peak current, thereby making it possible to use a unit of lower D.C. rating than would be normally required. In low frequency work, the objection is brought out that extremely high pulse currents cause cathode sputtering. It is well known that cathode sputtering is caused by positive ion bombardment. I find that at frequencies approximately above 10,000 cycles per second, the mobility of these positive ions is apparently retarded and they actually act as an ion reservoir and cathode shield for pulses of extremely high intensity and short duration and do not cause harm during short periods of conduction. For example, in the circuitry herein disclosed, a damping diode is used which has for a particular machine an average current rating of one-half ampere and a peak current rating of two amperes for normal performance. In the particular device used, for reasons to be explained later, the peak current requirement of this tube in this circuit is 48 amperes and the average current requirement is one-quarter ampere. I find that the life of this tube is not seriously harmed by operating under these extreme pulse conditions at relatively high frequencies. A disturbing factor is that the glass envelope of such a tube becomes blackened relatively early in life from elements sputtered from one or the other of the electrodes. The tubes in this circuitry exhibit excellent life characteristics and examination of a cathode after one thousand hours of operation indicates a substantial decease in emissive substance; however, it is a uniform loss and areas of the cathode do not break down or flake off, as happens typically in a low frequency, long duration burst of energy. This performance is characteristic only of a gas rectifier. Solid state rectifiers do not have performance characteristics high enough to meet this extreme condition and if a vacuum rectifier of equivalent rating were used, relying upon vacuum conduction, the cathode would most certainly be stripped after one or two cycles of operation since there is no protecting ion sheath about the cathode. Such exceptional performance is normally only rated for hydrogen gas diodes in extremely high current nominal frequency range applications such as radar. Hydrogen diodes further exhibit extremely high mobility of both ionization and deionization and are thus used in such circuits in which ionization time is typically a half microsecond or less and deionization time is in the range of 50 microseconds, permitting operation in the 20 kilocycle region. Such rectifiers for most applications in EDM have too low an average current rating, too high a voltage drop and are too extreme in cost. In circuits such as radar, this fast ionization and deionization time is required for proper fidelity of the equipment. Thus, the only rated gas diodes for use above 10 kc. are hydrogen diodes. Hydrogen diodes suffer other limitations that do not readily lend themselves to EDM and it is intended, therefore, that they not be included in this circuitry embodying gas rectifiers.

The importance of negative regulation will become apparent from the discussion of specific circuits but stated briefly at this time, the negative regulation characteristics of gas rectifiers limit open circuit voltage and provide additional accelerating voltage for circuit inductance which is ever a problem in high frequency, high current, low voltage EDM. The third consideration for using gas diodes of the general class described is that by coincidence, their voltage characteristics are just slightly less than that of the EDM gap. In other words, in a gas rectifier, initial conduction begins at 11 volts and drops to approximately 7 volts under high current conduction. An EDM gap requires at least 20 volts for initial ionization and approximately 15 volts for conduction. Thus, if a gas rectifier is used in opposite polarity across the working gap, circuits that are normally oscillatory are damped by this voltage condition and are limited to voltages below those required for reverse firing of the arc. This concept will become apparent from the consideration of the circuitry about to be described.

It is therefore the object of my invention to provide improved EDM apparatus having the characteristics above set forth.

In the accompanying drawings, typical circuits embodying the principles of my invention are shown. In the drawings.

Figure 1:
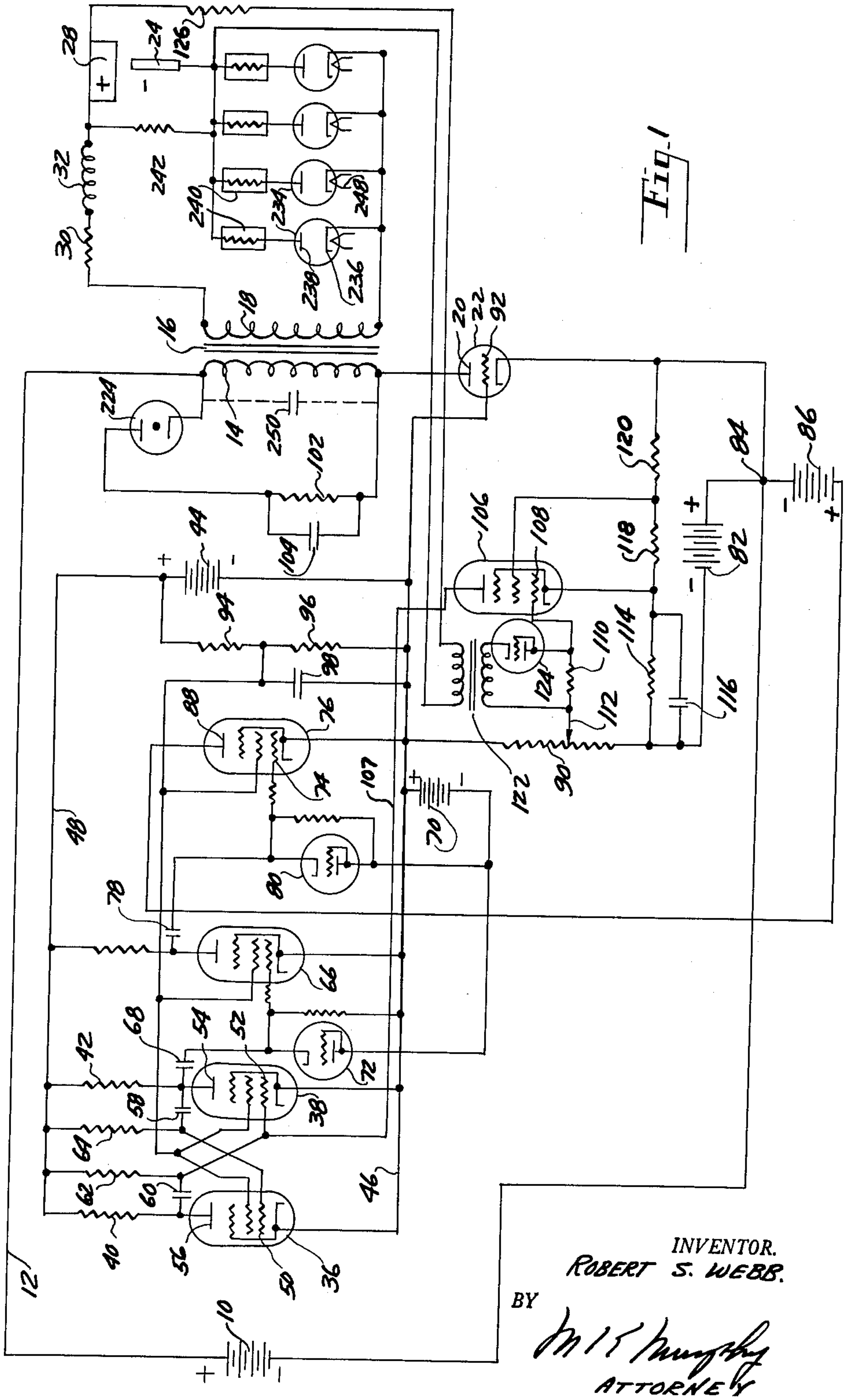
FIG. 1 is an electrical-discharge-machining circuit of the impedance matching type embodying gas rectifier tubes between the secondary of the impedance matching transformer and the machining gap.

Referring now to FIG. 1, it may be seen that I have shown at 10 the main power supply for the apparatus, which comprises a 300-volt, D.C. supply, this voltage being about maximum for the plate supply of the 6AS7 power tubes. A lead 12 from the positive side of the power supply connects to one side of primary 14 of the power transformer 16. The latter has a secondary 18 and is of the iron-core type, although an air-core transformer may be used for more delicate machining, particularly finishing operations.

The other side of primary 14 is connected to the anode 20 of a power tube 22. It will be understood that the tube 22 represents a bank of tubes (in this instance 6AS7's) connected in parallel. Almost any number of such tubes may be connected to provide the required power flow through the gap.

The secondary 18 of the gap power transformer is connected at one side to the workpiece 28, the elements 30 and 32 representing respectively the lumped resistance and lumped inductance of the leads from the secondary to the gap. The other side of secondary 18 is connected to electrode 24 through a paralleled bank of gas rectifiers 234, there being as many or as few as necessary for the particular circuit in operation.

The power tube bank 22 is controlled by a multivibrator network which comprises tubes 36 and 38. These tubes are preferably pentodes, type 6DQ5. The plates or anodes of these tubes are connected through load resistors 40, 42, and lead 48 to the positive terminal of a suitable power supply 44, the negative terminal of which is connected with the cathodes of the tubes by lead 46. The power suppyl 44 may be separate or it may be derived from the main supply 10 as desired.

The control grids 50, 52, of the tubes 36, 38, are cross-connected to the anodes 54, 56, respectively through coupling condensers 58, 60, and are connected to the positive side of the multivibrator power supply through the grid resistors 62, 64.

The output signal from multi-vibrator tubes 36, 38 is fed into an amplifier, which may comprise one or more pentode tubes 66, through condenser 68 and clamped to negative bias voltage 70 through diode 72. The amplified and resquared signal from tube 66 is fed to the grid 74 of pentode 76 (which may be one of a bank) where it is again amplified before being fed to the power tube bank 22. The coupling to the "driver" tube 76 is through a coupling condenser 78 and a clamping diode 80 is provided to insure positive cut-off characteristic. Suitable isolation and signal resistors are also provided as shown to control the operating characteristics of diodes 72 and 80.

The power required to drive the main power tube bank 22 is in the order of several hundred watts, and to obtain increased efficiency, the amplifier 76 is floated in the grid circuit of the bank 22 rather than connected to the negative terminal of bias supply 82 as would be expected. Since the control signal appears between the cathode of driver 76 and point 84 of the circuit which is grounded, the network just described, which comprises a multivibrator and two stages of amplification, may be thought of as a floating signal source.

The output signal from this network is of rectangular wave form and is of substantially greater magnitude than that obtained from the conventional square wave generator. Normally these signal generators have an output of approximately ten watts. In the EDM circuit of FIG. 1, the power required to drive the grids of the tube bank 22 is in the order of two hundred watts and more. A booster power supply 86 is preferably provided in series with the bias supply 82 to provide adequate voltage for the plate 88 of driver 76.

The output signal from driver tube 76 is developed from the voltage drop across variable resistor 90, which signal pulse with the added voltage of power source 82 constitutes the drive to the grids 92 of the bank 22. Proper adjustment of the circuit parameters will provide a signal at grids 92 having a selected on-time characteristic.

As stated above, the signal generator power supply is the source 44. Resistors 94 and 95, the latter being shunted by a condenser 98, are provided as shown.

The primary 14 of transformer 16 has a damping network consisting of diode 224, resistor 102 and shunt capacitance 104 connected in shunt therewith.

The transformer 16 must be a stepdown transformer capable of handling relatively high currents at relatively high frequencies. The development of extremely thin iron lamination stock and specialized design now makes possible the design of transformers having the characteristics required for the circuit of FIG. 1. The transformer selected should have a maximum voltage swing on the primary equal to the peak voltage rating of the power tube selected and a turns ratio which will match the gap voltage required in EDM.

The aforementioned damping network limits the induced voltage or negative fly-back in the primary 14, which occurs between power pulses, to the voltage rating of the tubes 22 and this prolongs the lives of these tubes.

As so far described, it will be seen that the tube bank 22 normally is biased to non-conducting condition by voltage source 82. An amplified signal from the multi-vibrator will be impressed on the grids 92 of the power bank 22 and will overcome the normal grid bias and render the tube bank conductive. In accordance with the preselected adjustment of the circuit parameters, a voltage will occur across the primary 14 which will induce a voltage in the secondary. This secondary voltage is instantly effective across the gap between electrode 24 and workpiece 28, and a power pulse will be delivered across the gap eroding the workpiece. This sequence is repeated at high frequency until the machining operation is completed or the operation interrupted by the machine's power feed, as is known in the art.

The gap between electrode 24 and workpiece 28 is flooded with dielectric fluid during machining as is common in EDM.

The circuit of FIG. 1 includes a "watch-dog," which functions automatically to cut-off the power to the gap in event of a short circuit condition, which might damage the workpiece, or in event of malfunction of the apparatus, which might cause damage to the workpiece or to the components of the apparatus.

This "per pulse cut-off" comprises a pentode 106, the control grid 108 of which is connected through a resistor 110 to tap 112, which latter taps the keying resistor 90 at an intermediate point. The grid 108 normally is biased non-conducting by the shunt resistor and condenser network 114, 116, which is connected across the voltage source 82 through the screen voltage resistor 118 and the voltage reducing resistor 120. The voltage across resistor 90 plus that of the source 82 is, of course, the voltage which drives the grids 92 of the power tube bank 22. A selected portion of this voltage is thus effective on the grid 108 of cut-off tube 106 and tends to render tube 106 conductive whenever bank 22 is rendered conductive. The plate of tube 106 is connected to the grid circuit of multivibrator tube 38 by line 107 and conduction through tube 106 will instantaneously cut-off operation of the multivibrator.

However, the secondary of a transformer 122 (called for convenience the "cut-off transformer") is connected across the resistor 110 through a blocking diode 124. The primary of the transformer 122 is connected across the gap between electrode 24 and workpiece 28 through a limiting resistor 126.

If the apparatus is functioning normally, a drive signal on grids 92 of the bank 22 will result in a striking voltage appearing across secondary 18 of power transformer 16 and the gap will fire. This voltage would have to be only about 20 volts if there were no losses in the firing circuit. However, normal circuit losses require a voltage magnitude of 60 volts or more, and should a short circuit occur across the gap, the short circuit current would be almost 150% of normal. With narrow pulse operation, the peak current selected is usually the peak rating of the individual tubes of the power tube bank, and a 150% overload of this pulse current would strip the tube cathodes with comparatively few pulses. This ordinary short circuit cut-off devices, such as thermally responsive devices, operate too slowly to provide protection.

It is understood that while this disclosure assumes that the electrode is at all times negative and the workpiece positive, this so-called "normal EDM polarity" may be reversed in certain instances, such as is explained in my copending application Serial No. 45,336, filed July 26, 1960, entitled "High Voltage-Reverse Polarity EDM," now Patent No. 3,158,728.

My per-pulse cut-off device permits the power circuit to be operated with maximum efficiency because it renders it unnecessary to limit the power input to the gap to less than maximum desired on account of possibility of short circuits. The cut-off device operates to cut off the power input instantaneously, that is to say, in about 5% of the period of a power pulse, and thus provides complete safety to the apparatus. This cut-off device is extremely important in the operation of the machine especially when precision machining of expensive workpieces is being performed, where heat checking of the hole being cut might require scrapping of the piece. The readiness of the device to function instantly is constantly maintained by the precise balancing of the circuit parameters. The connection of grid 108 to the keying resistor 90 tends to render tube 106 conductive each time the multivibrator pulses, but the dominating negative bias of the network 114–116 inhibits conduction of tube 106 in the absence of any keying signal. During normal operation, the keying pulse voltage developed across resistor 90 is exactly neutralized in the grid circuit of tube 106 by the action of circuit 122, 124, 110. However, appearance of a voltage across the primary of transformer 122 (gap voltage) lower than a preset minimum will upset this voltage balance and instantaneously cause tube 106 to conduct and cut off the multivibrator through line 107. It is, of course, clear that the "leading edge" of the power pulse just initiated will cross the gap, but the cut-off is so fast that the power pulse will be literally squelched after initiation and no appreciable power will be delivered to the gap.

Interruption of operation of the multivibrator will, of course, cut off tube bank 22 as well as tube 106. After the normal pulse repetition delay time, the multivibrator will resume pulsing, and if the trouble in the gap which caused the abnormal low voltage has cleared, such as by back-up of the power feed, clearing of sludge, or the like, normal machine operation will be restored automatically.

It will be understood that the cut-off circuit shown is not limited to use with the particular power delivering circuit shown. It would be equally useful with other gap power circuits whether of the impedance matching type or not.

The peak voltage variations of primary 14 of transformer 16 are damped by a network comprising a gas rectifier 224, resistor 102 and shunt condenser 104. Were it not for this damping network, the induced secondary voltage would fly back with sufficient magnitude to charge the inherent circuit capacity (represented by the condenser 250) and there would be danger of breakdown of some circuit element, the flyback voltage being of a transient oscillatory nature. In addition, the rectifier 224 functions as a damper upon instantaneous cut-off of tube bank 22.

During power conduction, relatively high current flows through primary 14 of transformer 16 and is stepped up in secondary 18 and presented to electrode 24 and workpiece 28 through rectifiers 234 and balancing impedances 240. This high secondary current flows through lumped inductance 32 which for purposes of analysis may be the combined inductance of the entire circuit comprising the inductance of the lead lengths of the secondary, the uncoupled inductance of the transformer and the lead lengths of the primary. As mentioned in the discussion, power tube bank 22 is rendered sharply conductive and non-conductive in phase with gap machining current and gap conduction is sharply interrupted by the abrupt turn-off of tube bank 22. Tube bank 22 is frequently composed of large numbers of pentode tubes connected in parallel, such tubes having the characteristic that the grid circuit and the on-off characteristics of the tube are relatively independent of anode voltages. Thus, as grid 92 renders tube bank 22 sharply non-conductive, lumped inductance 32 sustains conduction in the primary 14 of transformer 16 and therefore in the anode circuit. This inductance would cause a fly back voltage of sufficient magnitude to be generated to break down or sustain conduction in some circuit element and in the absence of rectifier 224, would charge lumped circuit capacity 250 to a sufficient magnitude or until breakdown of some other element occurred, thus permitting dissipation of the stored energy in inductance 32. In the circuit of FIGURE 1, rectifier 224 obviously assumes this conduction. If rectifier 224 were a vacuum device, it would necessarily have a peak current rating equal to the peak current rating of the entire tube bank 22 and would thereby be a very large and costly device. Since the transient current and resultant induced power of inductance 32 flows only for a minute portion of each cycle, a gas rectifier of relatively low average ratings and nominal low frequency peak ratings may be used, in the particular circuit under consideration. The peak current rating of tube bank 22 in one particular device now in production is 48 amperes and therefore the instantaneous peak current conduction of rectifier 224 will be 48 amperes immediately upon turn-off of tube bank 22. Depending upon the choice of resistor 30 and condenser 32, the voltage level at which this 48 amperes occurs is chosen to properly decelerate inductance 32 to provide sufficient off-time between pulses and recovery before subsequent pulses. As mentioned earlier, the particular rectifier used has a peak rating of 2 amperes and an average rating of one-half ampere; and in this circuit, operating above 10 kc., absorbs 48-ampere peak current pulses or a peak recurrent surge 24 times higher than its normal rating. In this instance, and with this particular device, it is believed that this is the approximate limit usable for reasonable tube life. The average current of this particular circuit is intentionally kept somewhat less than the average current rating of the rectifier so that the cathode can provide a suitable ion cloud as a high frequency reservoir for these high peak currents. I find that a rectifier of this type operated at extremely high peak currents near its D.C. rating as well, tends to drastically reduce tube life and an average current rating of arbitrarily approximately 50% of the manufacturer's rating is used in circuits of this extremely high peak current requirement. I find that operation sufficiently under the D.C. rating of such a gas rectifier is far more important than the actual peak rating and no practical limit has yet been determined for these devices.

The voltage developed across secondary 18 of transformer 16 is, of course, A.C. and is substantially rectangular in wave form. A bank of gas rectifier tubes composed of typical tubes 234 having cathode 236, anode 238 and filament heaters 248, operate to conduct in-phase with tube bank 22 and to block the reverse portion of voltage across secondary 18 from the machining gap. Minute ionic reverse leakage is shunted around the gap by resistor 242 having relatively high resistance and therefore representing relatively low loss in the forward direction. This eliminates negative voltage from the machining gap, thereby eliminating reverse firing of the gap. In most forms of high frequency EDM commercial today, the peak current requirement of rectifier 234 is less extreme in comparison to its average current characteristics than that of rectifier 224 and frequently falls within the rating of the particular gas rectifier used. Such low voltage, high current, gas rectifiers are readily available at very reasonable prices and a typical rectifier for such an application would be a type 623 or 643 having average current capacity per unit of approximately 15 amperes D.C. and peak voltage characteristics well in excess of that required by the fly back voltage of secondary 18.

As mentioned earlier, a typical starting voltage of these gas rectifiers is approximately 13 volts and a conduction voltage of approximately 7 volts occurs. For parallel units, balancing means is shown in this instance, as impedance 240 but may actually more properly be a portion of the inherent circuit inductance 32 at these relatively high frequencies arranged to form a balanced inductance link. The only requirement for inductive balancing is that the inductance at the lowest frequency used be sufficient within the current rating of an individual device to balance the difference between the starting voltage and conduction voltage; or in other words, 13 minus 7 equals 6 volts. Should one device conduct without balancing means 240, from the previous description higher current results in lower voltage rather than a higher voltage and therefore, once conduction occurs in one unit, balancing and subsequent conduction of other diodes connected in parallel must be effected by external balancing means. The importance of the negative regulation characteristic of gas rectifiers is that on open circuit where a condition in which electrode 24 is separated from workpiece 28 such that no discharge occurs, the low current conduction drop or starting drop of rectifiers 234 is higher than the heavy current drop thereby minimizing open circuit voltage and corresponding hazard to the operator. The power portion of the voltage developed across secondary 18 is normally several times higher than the actual arc drop in order to provide sufficient acceleration for inductance 32. After initial conduction occurs, the negative resistance characteristics of rectifier 234 assist this acceleration and produce a controlled voltage drop.

While use of the impedance matching transformer 16 has been stressed in the above description, it will be understood that almost any source of high frequency A.C. may be used.

Figure 2:
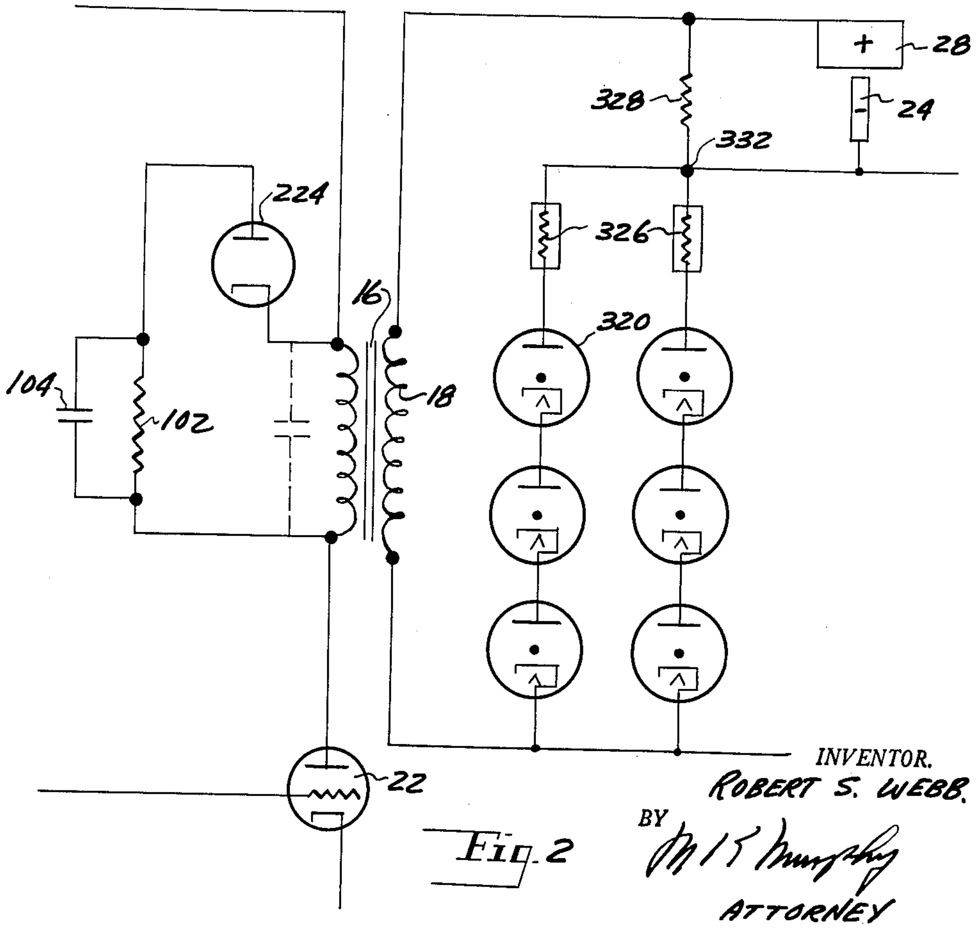
FIG. 2 is a modification of the circuit of FIG. 1.

These characteristics of low open circuit voltage and negative resistance producing high accelerating voltage for inductance 32 are compounded when series rectifiers are used as shown in FIGURE 2. In FIGURE 2, each of the several rectifiers connected in series has similar characteristics and each produces more effective regulation on open circuit and higher accelerating drops, from the combined series effect, corresponding balancing means in each leg shown as impedance 326 must be of a corresponding higher value to balance the total drop required for the number of series connected rectifiers. In this particular circuit, three rectifiers 320 are shown connected in series and a corresponding difference of 6 volts per rectifier would indicate that 18 volts drop must occur in balancing means 326. Again, this may be resistance or more generally in high frequency work, it is actually inductance and represents a substantial portion of the inherent inductance in lead lengths from part to part. Decrease in open circuit voltage occurs whether element 326 is resistance or inductance because the very light load characteristic of open circuit through resistor 328 causes little or no drop across element 326 and sustains each device at its high voltage starting condition thereby reducing the open circuit voltage presented at the gap and element 326 need only be of sufficient impedance to balance each string at the rated peak current of that particular string of diodes.

Figure 3:
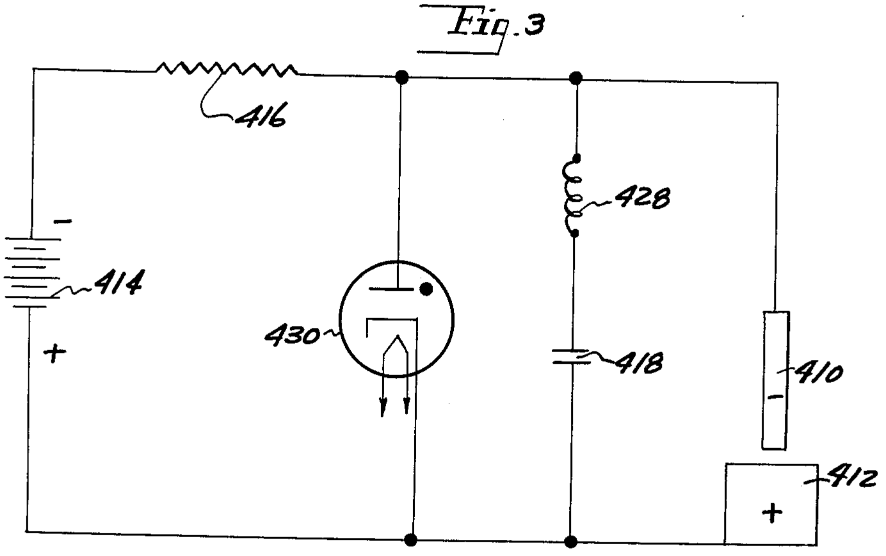
FIG. 3 is a further modification showing the principles of my invention applied to a relaxation oscillator EDM circuit.

Attention now is directed to FIG. 3 which shows a standard relaxation oscillator EDM circuit with a "reverse diode" modification.

In this circuit, power voltage 414, resistor 416 and condenser 418, in conjunction with electrode 410 and workpiece 412, generally of the polarity shown, form the basic relaxation oscillator circuit elements. Connected in this instance to normal negative terminal of condenser 418 common to the discharge loop as well as the charging loop is inductance 428 which generally is the unavoidable lead length inductance and internal inductance inherent in capacitor 418, lumped as representative inductance 428. As is well known in the performance of relaxation oscillator circuitry, power voltage 414 charges condenser 418 through resistor 416. Generally, the charging current is of low enough magnitude and low enough differential change that inductance 428 may be neglected. As condenser 418 is charged to a sufficiently high value, the gap breaks down and electron flow occurs from condenser 418 through inductance 428, electrode 10 and workpiece 12. Immediately upon conduction, the gap breaks down and falls to approximately 15 volts. The difference between this voltage and condenser 418 momentarily occurs across inductance 428 thereby energizing the field of this inductance. As condenser 418 drops to 15 volts or below, this voltage is insufficient to sustain conduction across the working gap and the stored energy in inductance 428 collapses to reverse polarity across 428 thereby over-discharging condenser 418 through the working gap. If power supply voltage 414 is 40 volts or more, the stored energy in inductance 428 becomes capable of over-discharging condenser 418 to 20 volts or more in the opposite polarity. In the absence of rectifier 430, this reverse voltage in excess of 20 volts would be capable of re-striking the gap in the opposite direction and would thereby result in an A.C. breakdown of the machining gap. It has been definitely established that unidirectional conduction across the gap is by far the most efficient and furthermore in an oscillatory circuit of this type a bilateral breakdown of the gap invariably results in squelching of the oscillation and ultimate D.C. conduction across the working gap in the normal polarity. This D.C. conduction referred to as D.C. arcing of course results in severe burns in the electrode and workpiece, since the arc does not transfer. It is possible to use a solid state rectifier or vacuum rectifier connected with its cathode on the positive side of the condenser and anode on the negative side of the condenser as determined by power supply 414. As reversal and polarity of condenser 418 are brought about by over-discharge forced by inductance 428 this rectifier becomes conductive and therefore prevents reverse firing. If a diode of sufficient rating to conduct this peak current is used either as a vacuum rectifier or solid state rectifier, many cycles of oscillation result from the low voltage drop across the rectifier and the corresponding resonant circuit of inductance 428 and condenser 418. This condition also results in ultimate D.C. breakdown of the working gap since the time constant of inductance 428, condenser 418, is much shorter than that of resistor 416, condenser 418, thereby forcing an unworkably high oscillation of the working gap. In order to conduct the extremely short duration high peak currents brought about by this oscillation, a solid state rectifier would necessarily be many times higher in rating than the D.C. component of current flowing through this rectifier. Furthermore, since the peak currents resulting would be many, many times that of the average current, the drop during conduction of such a rectifier would be extremely high and in many instances exceed 20 volts. If a reverse voltage of 20 volts in exceeded across this rectifier, of course, reverse conduction is caused across the working gap since this rectifier is connected directly across the working gap. As described earlier, in this disclosure, the characteristics of a gas type rectifier particularly operated at higher frequencies are such that extremely high peak currents may be conducted without causing severe damage to the rectifier or reduction in normal life and furthermore, in a manner exactly opposite to a solid state rectifier or vacuum rectifier higher peak currents result in lower rectifier voltage. Conversely, since the rectifier drop is substantially resistive, the oscillation in inductance 428 and condenser 418 is rapidly damped at a voltage coincidentally below that required to reverse fire the gap. As mentioned before, an EDM gap requires at least 20 volts for initial breakdown and approximately a 15-volt arc drop, whereas gas rectifiers of this type start conduction at approximately 13 volts and maintain high current conduction at approximately 7 volts, a value safely under the limits of the working gap. For this reason, a gas rectifier offers far better performance in this type of circuitry than any other and is unique by coincidence because of the relative voltages involved in EDM.

It will be understood that several rectifier tubes 430 may be used in parallel, series or in series parallel to match required load conditions and matching impedances will be used as explained above.

I claim:

1. In an electrical discharge machining apparatus for machining a conductive workpiece by intermittent electrical discharge across a gap between an electrode and the workpiece in the presence of dielectric coolant, a power supply, a pulse transformer having its primary winding connected in series with an electronic switch operated at frequencies of at least 10 kilocycles and said supply, said pulse transformer having its secondary winding connected across said gap to provide machining pulses to said gap in phase with said switch, and at least one gas diode connected in series between said secondary winding and said gap.

2. The combination as set forth in claim 1 in which said machining pulses are of time duration shorter than the deionization time for said gas diode.

References Cited by the Examiner

UNITED STATES PATENTS

| | | | |
|---|---|---|---|
| 2,255,141 | 9/1941 | Weir | 315—95 |
| 2,501,954 | 3/1950 | McKechnie | 315—227 |
| 2,544,477 | 3/1951 | West | 315—227 |
| 2,615,139 | 10/1952 | Coleman | 313—213 |
| 2,651,005 | 9/1953 | Tognola | 315—223 |
| 2,866,921 | 12/1958 | Matulaitis | 315—227 |
| 2,979,639 | 4/1961 | Williams | 315—227 |
| 3,089,059 | 5/1963 | Porterfield | 315—227 |
| 3,108,597 | 10/1963 | Moss | 307—88.5 |

GEORGE N. WESTBY, *Primary Examiner.*

RALPH G. NILSON, *Examiner.*